United States Patent
Takei et al.

(10) Patent No.: US 8,265,844 B2
(45) Date of Patent: Sep. 11, 2012

(54) FLOW CONTROL VALVE FOR CLUTCH CONTROL DEVICE

(75) Inventors: Yoshihiro Takei, Kanagawa (JP);
Yasushi Yamamoto, Kanagawa (JP);
Hiroyuki Kawanishi, Kanagawa (JP)

(73) Assignee: Isuzu Motors Limited, Tokyo (JP)

(*) Notice: Subject to any disclaimer, the term of this patent is extended or adjusted under 35 U.S.C. 154(b) by 539 days.

(21) Appl. No.: 12/450,228

(22) PCT Filed: Mar. 13, 2008

(86) PCT No.: PCT/JP2008/054607
§ 371 (c)(1),
(2), (4) Date: Sep. 17, 2009

(87) PCT Pub. No.: WO2008/120550
PCT Pub. Date: Oct. 9, 2008

(65) Prior Publication Data
US 2010/0094517 A1    Apr. 15, 2010

(30) Foreign Application Priority Data
Mar. 20, 2007 (JP) .................. 2007-071856

(51) Int. Cl.
*G06F 7/00* (2006.01)
*G06F 17/00* (2006.01)

(52) U.S. Cl. ............ 701/68; 477/70; 477/77; 477/78; 477/57; 74/730.1; 74/731.1; 74/732; 192/3.28; 192/3.29; 192/3.3; 192/85.63; 192/85.01; 191/221

(58) Field of Classification Search .......... 701/68; 477/70, 77, 78; 191/221; 74/730.1, 731; 192/3.28, 3.29, 3.3, 85.63, 85.01
See application file for complete search history.

(56) References Cited

U.S. PATENT DOCUMENTS
2,707,408 A * 5/1955 Ahlen ................. 477/57
(Continued)

FOREIGN PATENT DOCUMENTS
EP    0 949 430 A2    10/1999
(Continued)

OTHER PUBLICATIONS

Intelligent Building Control of Water Tank Based on Fuzzy Theory; Jiang Wei; Intelligent Computation Technology and Automation (ICICTA), 2010 International Conference on; vol. 2; Digital Object Identifier: 10.1109/ICICTA.2010.788; Publication Year: 2010 , pp. 549-552.*

(Continued)

*Primary Examiner* — Cuong H Nguyen
(74) *Attorney, Agent, or Firm* — McGinn IP Law Group, PLLC (57) ABSTRACT

A clutch control device for vehicle is equipped with a clutch actuator driven by a working fluid, and works to correctly control the rate of connection of the clutch by a simple means compensating secular change of a flow rate control valve that controls the working fluid. The clutch control device has a single flow rate control valve 1 for controlling the feed and discharge of the working fluid to change the stroke of the clutch actuator 110. The flow rate control valve 1 has a neutral position at where feed and discharge of the working fluid is stopped. A flow rate control valve control device 9 is provided with a learning device 91 for learning the neutral position. To control the stroke, the flow rate control valve control device 9 corrects the amount of electric current to a coil 8 of an electromagnetic solenoid based on a value learned by the learning device 91 and compensates a change in the flow rate characteristics caused by secular change. The neutral position is learned when the rate of change in the stroke is substantially zero.

10 Claims, 10 Drawing Sheets

U.S. PATENT DOCUMENTS

| | | | | |
|---|---|---|---|---|
| 2,808,737 A | * | 10/1957 | Bullard, III | 475/78 |
| 3,274,946 A | * | 9/1966 | Simmons | 91/490 |
| 3,381,472 A | * | 5/1968 | Brown et al. | 60/325 |
| 3,463,034 A | * | 8/1969 | Miller | 475/83 |
| 3,477,225 A | * | 11/1969 | Vanzandt et al. | 60/433 |
| 3,528,322 A | * | 9/1970 | Schou | 475/75 |
| 3,580,107 A | * | 5/1971 | Orshansky, Jr. | 475/78 |
| 3,782,225 A | * | 1/1974 | Grabow | 74/720 |
| 3,864,991 A | * | 2/1975 | Nembach | 74/733.1 |
| 3,897,697 A | * | 8/1975 | Chambers et al. | 475/80 |
| 3,899,957 A | * | 8/1975 | Carlson et al. | 91/490 |
| 4,185,521 A | * | 1/1980 | Beals | 477/69 |
| 6,733,299 B2 | | 5/2004 | Eguchi et al. | |

FOREIGN PATENT DOCUMENTS

| | | | |
|---|---|---|---|
| JP | 7-145830 | 6/1995 | |
| JP | 9-32867 | 2/1997 | |
| JP | 9-210189 | 8/1997 | |
| JP | 11-294484 | 10/1999 | |
| JP | 2003-120721 | 4/2003 | |
| JP | 3417823 | 4/2003 | |
| JP | 2004-125004 | 4/2004 | |
| JP | 2005-335627 | 12/2005 | |
| JP | 2005-344865 | 12/2005 | |
| JP | PCT/JP2009/066137 | * | 3/2011 |
| JP | PCT/JP2009/066138 | * | 3/2011 |
| JP | PCT/JP2009/066139 | * | 3/2011 |

OTHER PUBLICATIONS

Low Power Piezoelectric Micro Mass Flow Controller for Liquid Fuel Injection; Schiffer, M.; Obermeier, E.; Stefanini, C.; Manente, V.; Tunestal, P.; Sensors, 2007 IEEE; Digital Object Identifier: 10.1109/ICSENS.2007.4388672; Publication Year: 2007, pp. 1392-1395.*

Online state and parameter estimation of an electrohydraulic valve for intelligent monitoring; Khoshzaban, M.; Sassani, F.; Lawrence, P.D.; Advanced Intelligent Mechatronics '97. Final Program and Abstracts., IEEE/ASME International Conference on Digital Object Identifier: 10.1109/AIM.1997.653015; Publication Year: 1997.*

A proportional microvalve using a bi-stable magnetic actuator; Shinozawa, Y.; Abe, T.; Kondo, T.; Micro Electro Mechanical Systems, 1997. MEMS '97, Proceedings, IEEE., Tenth Annual International Workshop on; Digital Object Identifier: 10.1109/MEMSYS. 1997.581809; Publication Year: 1997, pp. 233-237.*

European Search Report dated Apr. 13, 2011.

* cited by examiner

FLOW CONTROL VALVE FOR CLUTCH CONTROL DEVICE

TECHNICAL FIELD

This invention relates to a flow rate control valve for controlling the working fluid in a clutch actuator in a clutch control device which automatically connects and disconnects a clutch provided in a vehicle by using a clutch actuator.

BACKGROUND ART

For easy driving of a vehicle and for reducing fatigue to the driver, various kinds of power transmission devices for vehicles have, in recent years, been widely used for easy driving. A representative example will be a so-called automatic transmission (AT) combining a torque converter and a planetary gear device together. A power transmission device which uses a transmission of the type of parallel shaft gear mechanism similar to the so-called manual transmission in combination with an automatic clutch, is one of such automatic power transmission devices for vehicles. In this power transmission device, a clutch disposed between an engine and a transmission is provided with a clutch actuator, and the clutch is automatically connected or disconnected at the time when the driver changes the speed by shifting the gear by using a shift lever or at the start of the vehicle eliminating the need of operating the clutch pedal by the driver. There has been further proposed a power transmission device which automatically shifts the gear depending upon the traveling condition of the vehicle by using an electronically controlled device obviating the need of operating the shift lever by the driver.

Figure 6:
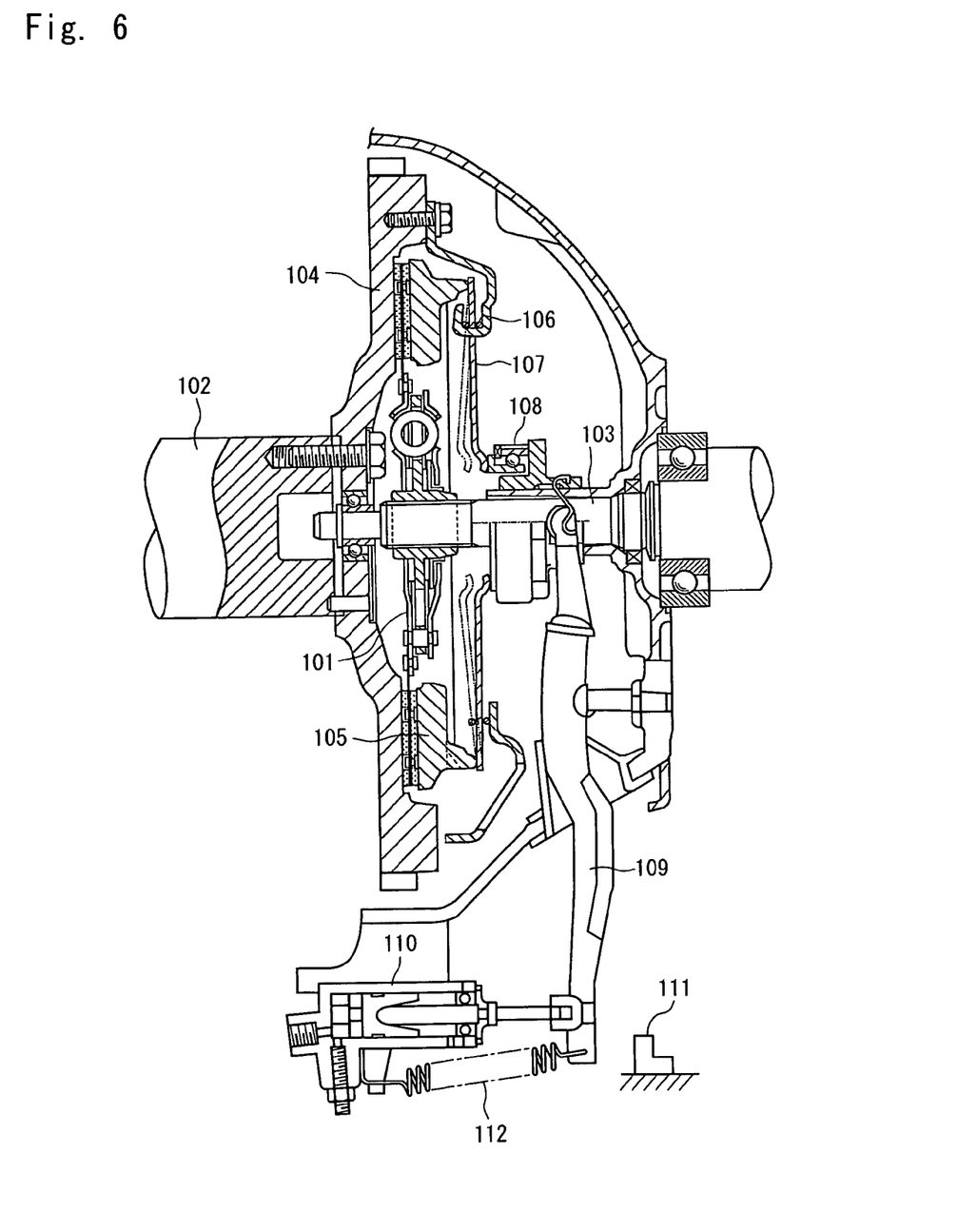
FIG. 6 is a view showing the constitution of a clutch for a vehicle.

A clutch (dry type single disk clutch) installed between an engine and a transmission is provided with a clutch disk 101 which has a friction disk fixed to the peripheral portion thereof as shown in FIG. 6. The clutch is slidably fitted by spline to a transmission input shaft 103 rotatably supported by a crankshaft 102 of the engine. A pressure plate 105 is provided on the back of the friction disk of the clutch disk 101 to bring the friction disk into pressed contact with a flywheel 104 at the rear end of the crankshaft 102. Further, a diaphragm spring 107 is attached to a clutch cover 106 that is fixed to the flywheel 104. When the vehicle is normally traveling, the diaphragm spring 107 brings the clutch disk 101 into pressed contact with the flywheel 104 via the pressure plate 105 and, therefore, the engine power is transmitted to the transmission input shaft 103 via the clutch disk 101.

The clutch is equipped with an operation mechanism for connecting and disconnecting the transmission of power, and the operation mechanism is constituted by a release bearing 108, a release fork 109, a clutch actuator 110 and the like. The clutch actuator 110 is a fluid pressure cylinder operated by a pneumatic pressure or a hydraulic pressure, and its piston is coupled to one end of the release fork 109. Provision is, further, made of a stopper 111 for mechanically limiting the movement in order to prevent the occurrence of damage to the clutch actuator 110 and the like caused by excessively large movement of the piston.

At the time of cutting off the engine power for shifting the gear of the transmission, the working fluid is fed to the clutch actuator 110 to displace one end of the release fork 109 toward the right in the drawing. The other end of the release fork 109 displaces toward the opposite direction, causing the release bearing 108 coming in contact therewith to slide leftward so that the diaphragm spring 107 moves as represented by a two-dot chain line in the drawing. Therefore, the spring force that pushes the pressure plate 105 is released, and the transmission of the engine power to the transmission input shaft 103 is cut off. To connect the clutch again after having finished the gear shift, the working fluid in the clutch actuator 110 is discharged, and the release fork 109 is moved leftward by a return spring 112 or the like. The state of clutch connecting (rate of connection) is determined by the movement of the clutch piston.

A clutch control device which automatically connects and disconnects the clutch at the time of gear shifting is provided with a working fluid pressure source such as an air tank that feeds the working fluid, a stroke sensor for detecting the movement of the piston of the clutch actuator, and control valves for controlling the amount of the working fluid in the clutch actuator. The clutch control device executes the clutch control at the time of gear shifting. Usually, the control valves are arranged in the working fluid feed pipe and in the discharge pipe, respectively. The rate of connection of the clutch is controlled by opening and closing these two control valves. There has also been known a clutch control device which feeds and discharges the working fluid in the clutch actuator by using a single flow rate control valve as disclosed in, for example, Japanese Patent No. 3417823.

Figure 7:
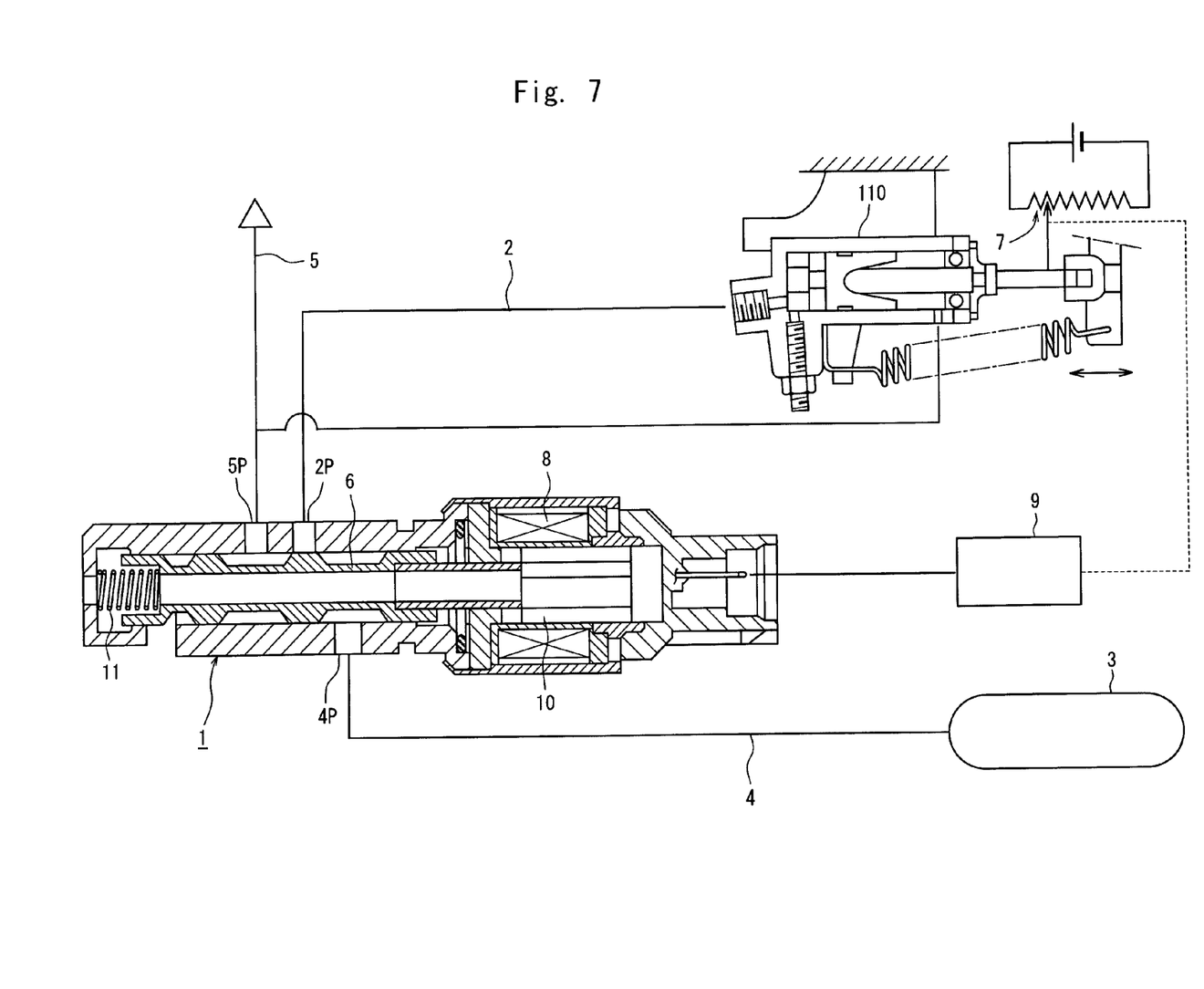
FIG. 7 is a circuit diagram of a conventional clutch control device.

In the clutch control device that uses a single flow rate control valve as shown in a circuit diagram of FIG. 7, the flow rate control valve 1 is connected to a communication passage 2 communicated with the clutch actuator 110, to a pressure source passage 4 communicated with the working fluid pressure source 3 such as an air tank, and to a discharge passage 5 for discharging the working fluid from the clutch actuator 110 and, further, includes three ports, i.e., a communication port 2p, a pressure source port 4p and a discharge port 5p formed therein and opened to the respective passages. The flow rate control valve 1 of FIG. 7 is a proportional control valve equipped with a drive device of the type of electromagnetic solenoid, and has such flow rate characteristics that the flow rate of the working fluid that flows through varies depending upon the position of a valve body 6. The flow rate control valve 1 is connected to a flow rate control valve control device 9 that sets the position of the valve body 6 by controlling the amount of electric current to a coil 8 responsive to a detection signal from a stroke sensor 7.

Figure 8:
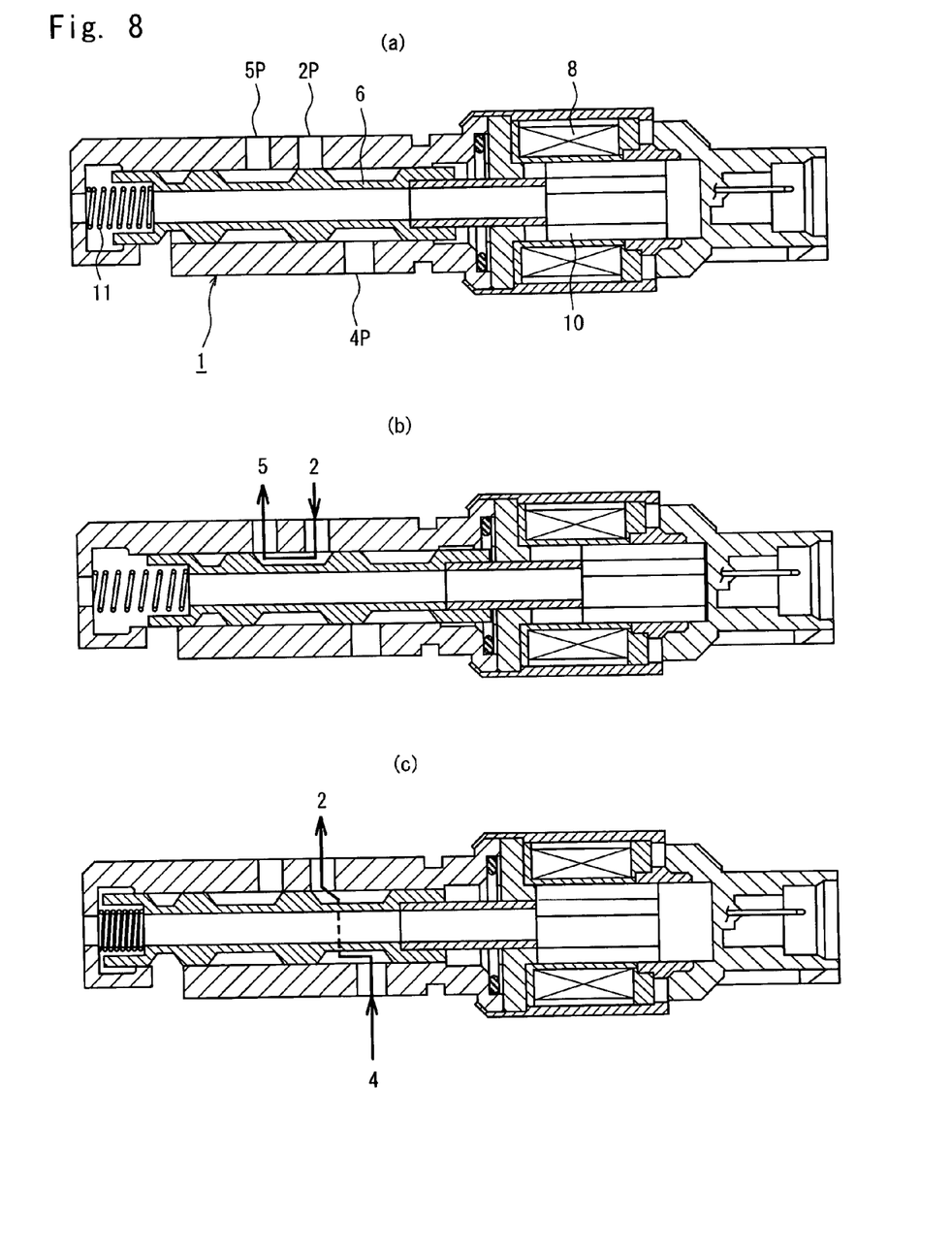
FIG. 8 is a view closely illustrating the operation of a flow rate control valve in the clutch control device.

As shown in detail in the operation view of FIG. 8, the valve body 6 of the flow rate control valve 1 has two lands on the way thereof, one end of the valve body 6 being coupled to a moving yoke 10 of the electromagnetic solenoid. A spring 11 is arranged at the other end of the valve body 6, and the position of the valve body 1 is determined by a balance between the magnetic force acting on the moving yoke 10 and the resilient force of the spring 11. When the flow of current to the coil 8 is interrupted (amount of current, 0%), the valve body 6 is pushed by the spring 11 and assumes a position shown in FIG. 8(b) whereby the communication port 2p communicates with the discharge port 5p, and the working fluid in the clutch actuator 110 is discharged to the exterior permitting the clutch to be connected. If the electric current flowing into the coil 8 assumes a maximum value (100%), the valve body 6 is brought to a position shown in FIG. 8(c) compressing the spring 11, and the communication port 2p communicates with the pressure source port 4p. Therefore, the working fluid in the pressure source 3 is introduced into the clutch actuator 110 through the communication port 2p, and the clutch is disconnected. When a 50%-current flows into the coil 8, the valve body 6 is brought to a position of FIG. 8(a), i.e., brought to the neutral position, and the communication port 2p is cut off from the power source port 4p and the discharge port 5p; i.e., the stroke of the clutch is maintained at this position. The flow rate characteristics of the flow rate control valve 1, i.e., the flow rates of the working fluid responsive to the electric current flowing into the coil 8 are as represented by a solid line in FIG. 9.

At the time of gear shifting, the clutch must be disconnected and connected quickly without causing shift shock. Therefore, at the time of connecting the clutch after having shifted the gear (after the gears are engaged), the piston of the clutch actuator 110 is, first, quickly moved in a direction of connection so as to quickly pass through an invalid region where the torque is not substantially transmitted, and the rate of connection is gradually increased in the so-called half-engage clutch region where the torque starts transmitting in order to avoid the shift shock caused by a sharp increase in the rate of connection as illustrated in a graph of FIG. 10 that shows changes in the stroke. To execute the above control, the stroke sensor 7 detects the displacement of the clutch actuator 110, and the flow rate control valve control device 9 controls the flow rate control valve 1 responsive thereto to vary the amount of the working fluid in the clutch actuator 110 so as to attain a target stroke.

Patent document 1: Japanese Patent No. 3417823

DISCLOSURE OF THE INVENTION

Problems that the Invention is to Solve

In order to correctly control the rate of connection of the clutch, it is required to quickly and correctly control the amount of working fluid in the clutch actuator by using the flow rate control valves. For this purpose, the flow rate control valve control device is storing flow rate characteristics representing a relationship between the amount of electric current to the coil of the electromagnetic solenoid and the flow rate (solid line in FIG. 10). By using the flow rate characteristics, the flow rate control valve control device controls the amount of electric current flowing into the coil so that the amount of electric current that flows assumes a value that corresponds to a target flow rate. In order to realize changes in the stroke (rate of connection) in FIG. 10, for example, the control is executed as shown in a graph of the amount of electric current to the coil shown in the lower part of FIG. 10.

Here, however, the individual flow rate control valves differ to some extent due to slight difference in the production process, and their flow rate characteristics representing the relationship between the amount of electric current and the flow rate differ to a slight degree depending upon the individual flow rate control valves. Further, even the same flow rate control valve may undergo a change in the flow rate characteristics due to secular change. For instance, in case a balance between the magnetic force of the electromagnetic solenoid and the spring changes due to secular change and the magnetic force decreases, the solid line representing the flow rate characteristics in FIG. 9 moves toward the right (broken line X) and in case the resilient force decreases, the solid line moves toward the left (broken line Y), and the neutral position of the flow rate control valve similarly moves. If the flow rate characteristics change as described above, the flow rate varies despite the amount of the electric current is maintained the same. As a result, the rate of connection of the clutch cannot be quickly and correctly brought to the target value, and the shift shock occurs.

The present invention solves the above-mentioned problem inherent in the flow rate control valve used in the clutch control device by using a simple means.

Means for Solving the Problem

In view of the above problem, the present invention provides a clutch control device that uses a flow rate control valve, wherein a flow rate control valve control device is provided with a learning device that learns the neutral position of the flow rate control valve, and a difference in the flow rate characteristics is compensated in order to correctly control the rate of connection of the clutch by using a simple means. Namely, the present invention is concerned with a clutch control device in a power transmission device for vehicle having a clutch installed between an engine and a transmission, wherein:

the clutch control device includes a clutch actuator driven by a working fluid, a stroke sensor for detecting the movement of the clutch actuator, a flow rate control valve for controlling the amount of the working fluid in the clutch actuator, and a flow rate control valve control device for controlling the position of a valve body of the flow rate control valve responsive to a detection signal from the stroke sensor;

the flow rate control valve is connected to a communication passage communicated with the clutch actuator, to a pressure source passage communicated with a working fluid pressure source, and to a discharge passage for discharging the working fluid from the clutch actuator, and, at the neutral position of the valve body, the communication flow passage is cut off from the pressure source passage and the discharge passage; and the flow rate control valve control device is provided with a neutral position learning device for learning the neutral position of the valve body, and the neutral position learning device decides that the neutral position is attained when a rate of change of the detection signal from the stroke sensor becomes smaller than a predetermined value.

As described in claim 2, the neutral position learning device can be so constituted as to decide that the neutral position is attained when the rate of change of the detection signal from the stroke sensor becomes smaller than the predetermined value continuously for a predetermined period of time.

As described in claim 3, when a maximum value that is mechanically limited is included in the movement of the clutch actuator, it is desired that the neutral position learning device executes the learning of the neutral position of the valve body when the movement of the clutch actuator is not smaller than a predetermined value but is smaller than the maximum value.

As described in claim 4, the neutral position learning device can be so constituted as to render the transmission to be neutral when the vehicle is at a halt and to operate the clutch actuator so as to execute the learning of the neutral position of the valve body. In this case as described in claim 5, it is desired that the neutral position learning device executes the learning of the neutral position of the valve body when the brake of the vehicle is being applied.

As described in claim 6, the flow rate control valve is provided with an electromagnetic solenoid for driving the valve body, and the flow rate control valve control device controls the electric current flowing into a coil of the electromagnetic solenoid to change the position of the valve body.

Effects of the Invention

When the single flow rate control valve is provided in the clutch control device and the working fluid is fed into, or discharged from, the clutch actuator through the flow rate control valve, the valve body in the flow rate control valve is displaced to one side from the neutral position to feed the working fluid, and is displaced to the other side to discharge the working fluid. The flow rate control valve control device of the invention is provided with the learning device for learning the neutral position, and detects, at all times, the amount of operating the flow rate control valve (e.g., amount of electric current to the coil of the electromagnetic solenoid) for attaining the neutral position. Even if the neutral position varies due to a difference inherent in the individual flow rate control valves or due to secular change, the amount of operating the flow rate control valve is corrected relying upon the neutral position stored in the learning device, and the flow rate is correctly so controlled as to attain a target position of the valve body in the flow rate control valve. It is, therefore, made possible to quickly and correctly change the rate of connection of the clutch at the time of gear shifting and to attain a clutch control without shift shock.

The device for learning the neutral position of the present invention decides that the neutral position is attained when a rate of change of the detection signal from the stroke sensor becomes smaller than a predetermined value. At the neutral position of the flow rate control valve, the working fluid is neither fed into the clutch actuator nor discharged therefrom, and there is no change in the stroke of the clutch actuator. Upon detecting the rate of change of the detection signal of the stroke sensor that becomes smaller than the predetermined value, therefore, it is allowed to detect the neutral position. The predetermined value is a small value close to zero, and is set by taking into consideration disturbance to the detection signal from the stroke sensor. According to the constitution of the invention of claim 2 in which it is decided that the neutral position is attained when the rate of change of the detection signal from the stroke sensor becomes smaller than the predetermined value continuously for a predetermined period of time, it is made possible to more reliably avoid a decrease in the precision of learning caused by disturbance.

The stroke sensor used in the learning device is a part that has heretofore been provided for the clutch control device for controlling the rate of connection of the clutch. Therefore, the learning device of the present invention is capable of learning the neutral position without the need of providing any particular part. Besides, since the clutch control device uses only one flow rate control valve, the control device as a whole can be simply constituted in a compact size.

The invention of claim 3 is intended for executing the learning of neutral position of the valve body when the clutch is in the state of being disconnected. At the time of gear shifting, a state where the rate of change of the stroke is zero with the clutch at the disconnected state continues for a predetermined period of time maintaining stability. During this period, therefore, the neutral position of the flow rate control valve can be accurately decided. To decide the disconnected state of the clutch, the movement of the clutch actuator may be detected to be larger than a predetermined value which is close to the position of disconnection. At the time of gear shifting, however, the clutch actuator is quickly brought to the position of disconnection and may often come into collision with a stopper that mechanically limits the movement. At this moment, too, the rate of change becomes zero with the stroke assuming the greatest value. In this case, however, the flow rate control valve is not necessarily at the neutral position. In the invention of claim 3, therefore, the neutral position of the valve body is learned when the movement of the clutch actuator is not smaller than the predetermined value and is smaller than the maximum value.

The neutral position of the flow rate control valve of the invention can be learned when the clutch is operated at the time of gear shifting or at the start of the vehicle. The invention can be so constituted as described in claim 4 by rendering the transmission to be neutral when the vehicle is at a halt, and operating the clutch actuator so as to execute the learning of neutral position. The invention of claim 4 is to operate the clutch by rendering the transmission to be neutral for a short period of time and cutting off the transmission of power from the engine to the wheels in an attempt to accomplish the learning while the vehicle is at a halt. The clutch control devices, in many cases, are provided with a half-engage clutch learning device, i.e., a device for learning, at regular intervals, a change in the stroke at a half-engage clutch position caused by wear of the clutch friction disk due to aging. The state of half-engage clutch is learned by executing the same operation as that of the invention of claim 4 while the vehicle is at a halt. The clutch control device equipped with the half-engage clutch learning device is capable of learning the neutral position of the flow rate control valve simultaneously with learning the state of half-engage clutch.

In the invention of claim 4, the clutch is operated by temporarily rendering the transmission to be neutral while the vehicle is at a halt. It is, therefore, desired to learn the neutral position of the valve body while the brake of the vehicle is being applied as in the invention of claim 5. In this case, even if the operation is erroneously executed, such an occurrence that the vehicle unexpectedly starts moving is prevented, and the neutral position can be safely learned.

Use can be made of a proportional control valve that is driven by the electromagnetic solenoid as the flow rate control valve, i.e., use can be made of a flow rate control valve which continuously varies the position of the valve body by controlling the electric current flowing into the coil of the electromagnetic solenoid coil by using the flow rate control valve control device as in the invention of claim 6. In this case, an electric control device is used to realize the device for driving the flow rate control valve and the control device therefor in small sizes.

BEST MODE FOR CARRYING OUT THE INVENTION

A clutch control device for vehicles embodying the invention will now be described with reference to the drawings. However, the clutch for vehicles and equipment constituting the clutch control device to which the invention is applied, are not particularly different from the conventional devices shown in FIG. 5 and other drawings. That is, the clutch for vehicles operated by the clutch control device of the invention is basically the same as the clutch of FIG. 6, and is equipped with a clutch actuator 110 for varying the rate of connection of the clutch. A working fluid is fed to the clutch actuator 110 from a fluid pressure source, the rate of connection of the clutch is determined by the movement of a piston in the clutch actuator 110, and a maximum value of the movement is mechanically limited by a stopper 111.

Figure 1:
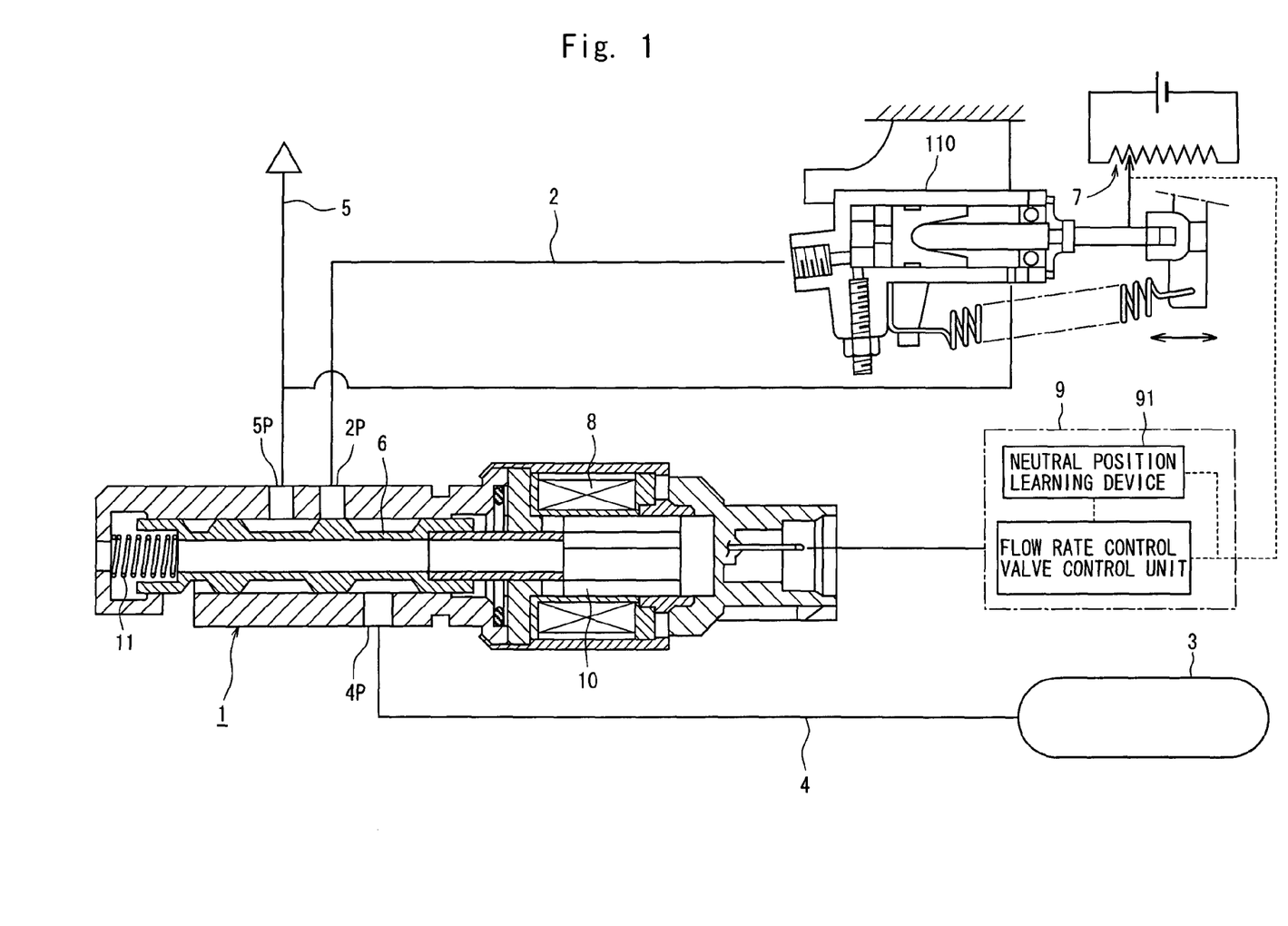
FIG. 1 is a circuit diagram of a clutch control device equipped with a learning device of the invention.

FIG. 1 shows a circuit constitution of the clutch control device of the invention. Equipment constituting the circuit of FIG. 1 are the same as those of the conventional counterparts of FIG. 7 with regard to the so-called hardware, and the corresponding parts are denoted by the same reference numerals. The clutch control device includes a single flow rate control valve 1 driven by an electromagnetic solenoid, the flow rate control valve 1 being connected to a fluid pressure source 3 such as an air tank, to a clutch actuator 110 and to a discharge passage 5. A flow rate control valve control device 9 controls the amount of electric current flowing into a coil of the electromagnetic solenoid to vary the position of a valve body 6, and varies the rate of connection of the clutch by feeding and discharging the working fluid into, and from, the clutch actuator 110. The movement (stroke) of the piston in the clutch actuator 110 is detected by a stroke sensor 7 and its signal is input to the flow rate control valve control device 9.

In the clutch control device of the invention, the flow rate control valve control device 9 is equipped with a neutral position learning device 91. By using a signal of a stroke of the clutch actuator 110, the neutral position learning device 91 learns the amount of electric current flowing into the coil 8, that corresponds to a neutral position of the flow rate control valve 1, i.e., that corresponds to a position where the flow of the working fluid through the flow rate control valve 1 is cut off. The neutral position learning device 91, too, receives the detection signal from the stroke sensor 7. In this invention, it is decided that the flow rate control valve 1 is at the neutral position when the rate of change of the stroke is substantially zero.

The operation of the neutral position learning device 91 will be described with reference to a flowchart of FIG. 2. The learning device of this embodiment is to execute the learning of the neutral position in a predetermined operation period. At step S1, a present stroke st(n) is read from a detection signal of the stoke sensor 7. The learning device 91 is storing a stroke st(n−1) detected when the learning was executed in the last time, and a differentiated value D which is a rate of change of the stroke, $$D=(st(n)-st(n-1))/\text{operation period}$$

is calculated at step S2. Next, at step S3, it is decided if D (absolute value) is smaller than a predetermined value. The predetermined value has been set to a small value and, therefore, it is allowed to detect that the rate of change of the stroke is zero even if the detection signal varies to some extent due to disturbance.

If D (absolute value) is not smaller than the predetermined value at step S3, the operation ends presuming that the flow rate control valve 1 is not at the neutral position. If it is decided to be smaller than the predetermined value, the routine proceeds to step S4 where the neutral position learning device 91 learns the amount of electric current flowing into the coil 8 of the electromagnetic solenoid as the amount of electric current at the neutral position. By using the thus learned amount of electric current at the neutral position, the neutral position learning device 91 corrects the value learned thus far. The updated learned value is used by the flow rate control valve control device 9 to control the flow rate control valve 1.

Figure 2:
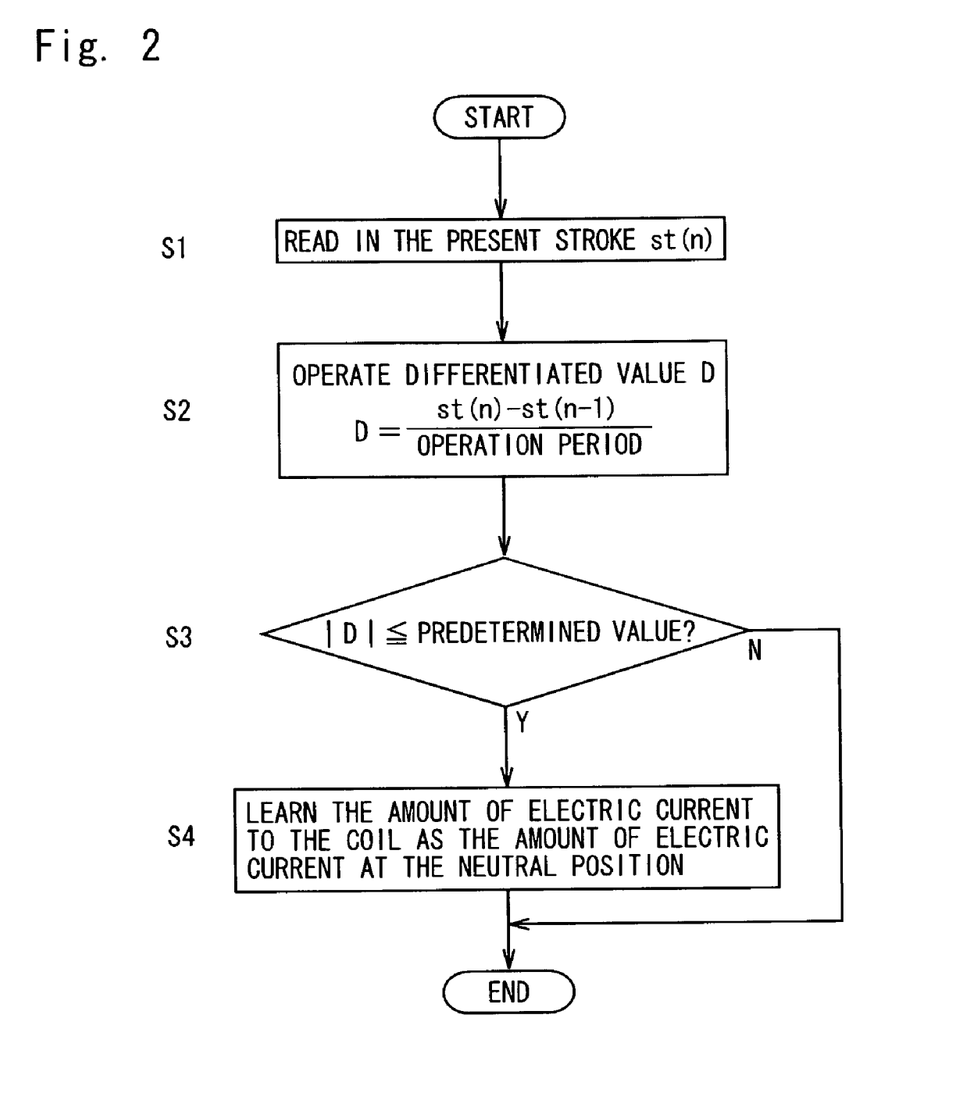
FIG. 2 is a flowchart of a neutral position learning device of the invention.

In the flowchart of FIG. 2, if the differentiated value D operated at step S3 is smaller than the predetermined value, the amount of electric current at that moment is immediately detected as the amount of electric current at the neutral position. On the other hand, if the differentiated value D becomes smaller than the predetermined value consecutively a plurality of number of times, i.e., if a state where the rate of change of the stroke is zero continues for a predetermined period of time, a condition is added for learning the amount of the electric current to improve the learning precision by precluding the effect of disturbance.

Figure 10:
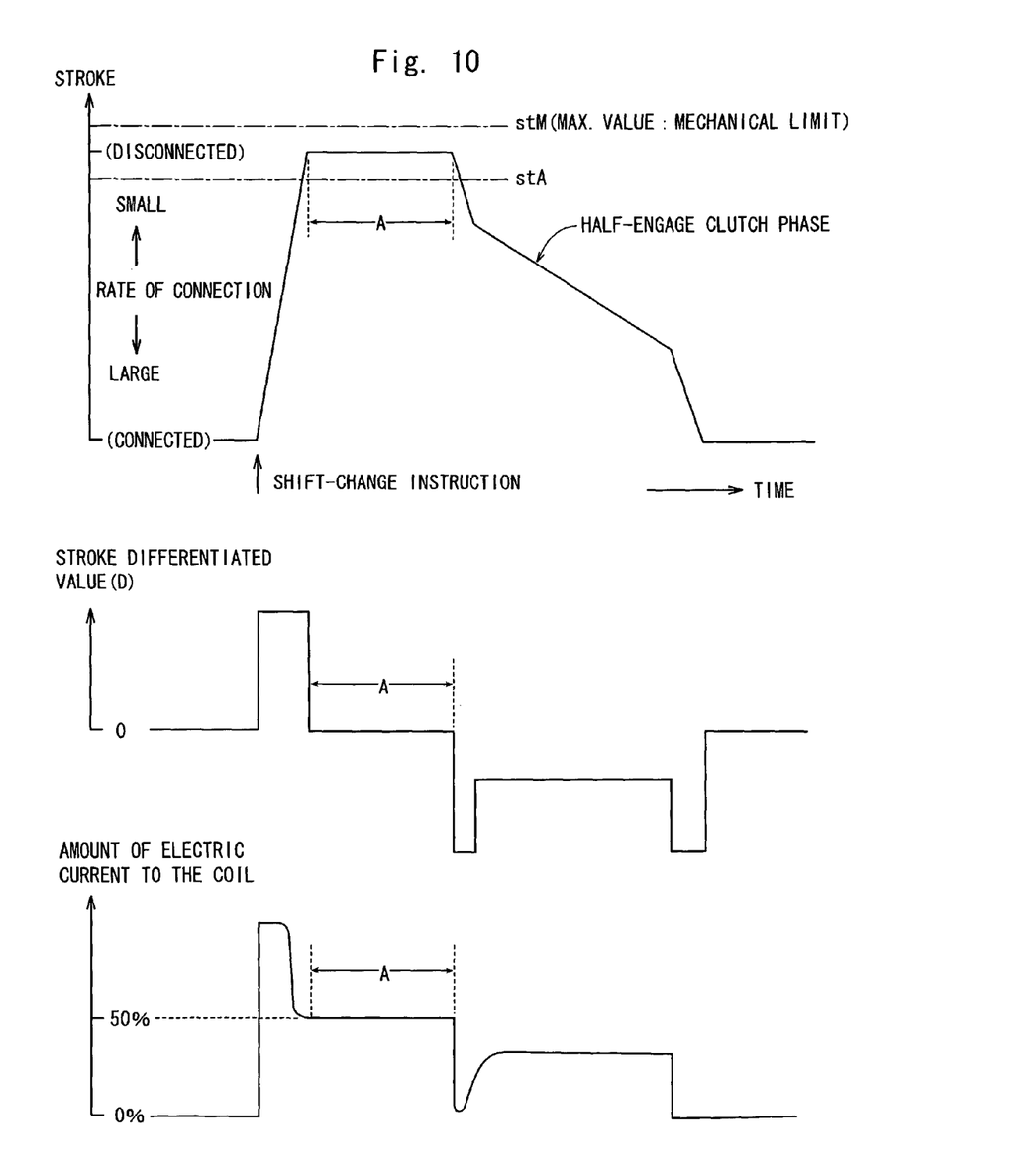
FIG. 10 is a diagram showing a mode of stroke control of the clutch.

In really operating the clutch as will be learned, for example, from FIG. 10 which shows changes in the stroke at the time of gear shifting, the state where the rate of change of the stroke is 0 continues (period A in a graph of FIG. 10) at a moment when the clutch has arrived at the completely disconnected position for gear shifting, and the flow rate control valve 1 is stably held at the neutral position. To improve the precision for learning the amount of electric current, therefore, it is desired to detect the amount of the electric current at a moment when the clutch is completely disconnected. Here, however, since the clutch is quickly disconnected, the movement of the clutch actuator may often arrive at a maximum value (stM) limited by the stopper 111 passing through the completely disconnected position. In this case, too, the rate of change of the stroke becomes 0, but the flow rate control valve 1 is not necessarily at the neutral position.

Figure 3:
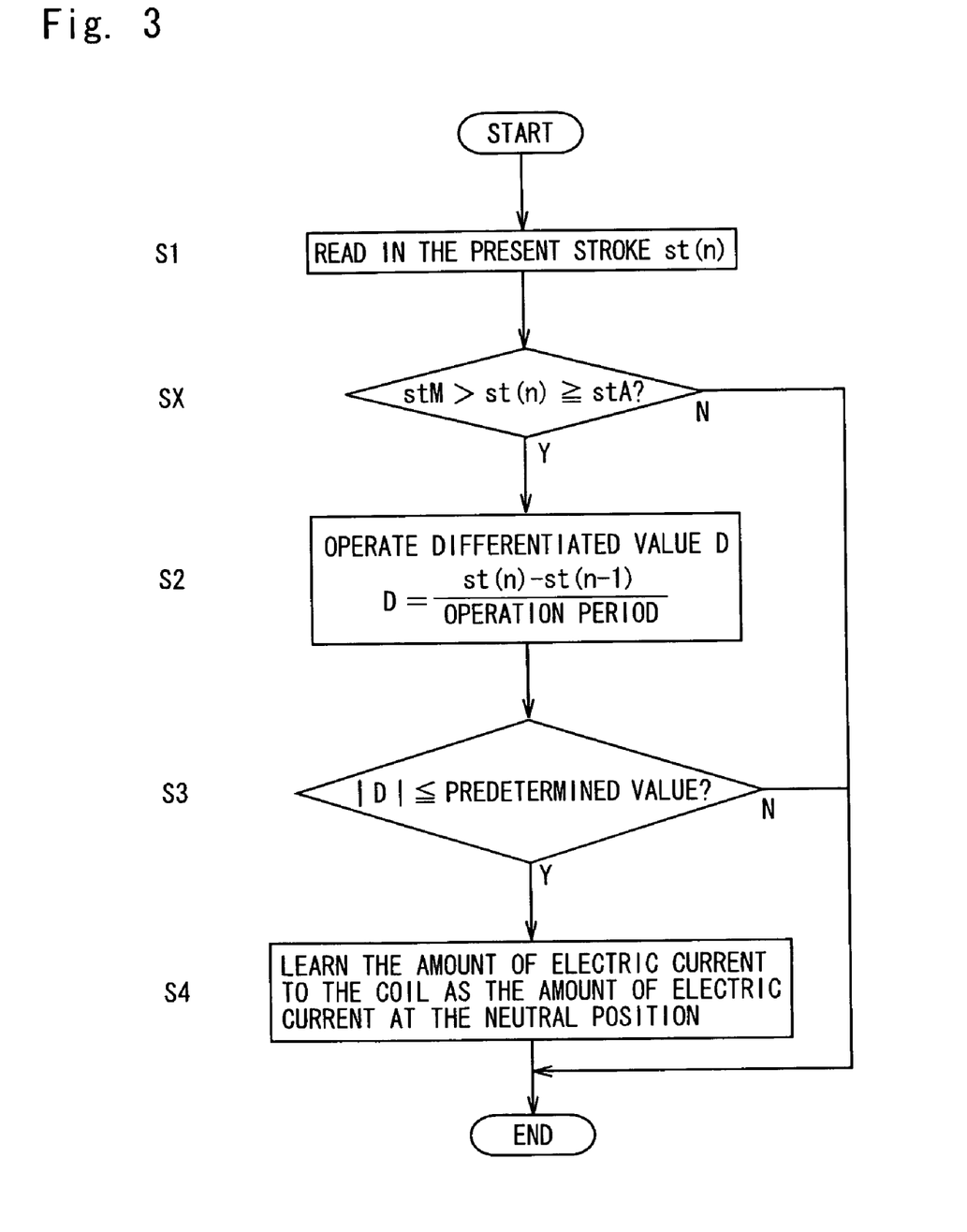
FIG. 3 is a flowchart of the neutral position learning device according to another embodiment of the invention.

A flowchart shown in FIG. 3 is the one in which the decision of step SX is added to the flowchart of FIG. 2 to detect the amount of the electric current when the clutch is completely disconnected. At step SX, it is decided if the present stroke st(n) of the clutch is greater than a predetermined stroke stA and is smaller than a maximum value stM that is mechanically limited. The predetermined stroke stA is set to a value close to the stroke of when completely disconnected, from which it is allowed to decide that the clutch is completely disconnected without coming into contact with the stopper 111. When completely disconnected, the routine proceeds to next step S2 where the neutral position is learned like in FIG. 2. When the condition of step SX does not hold, no learning is executed.

Figure 4:
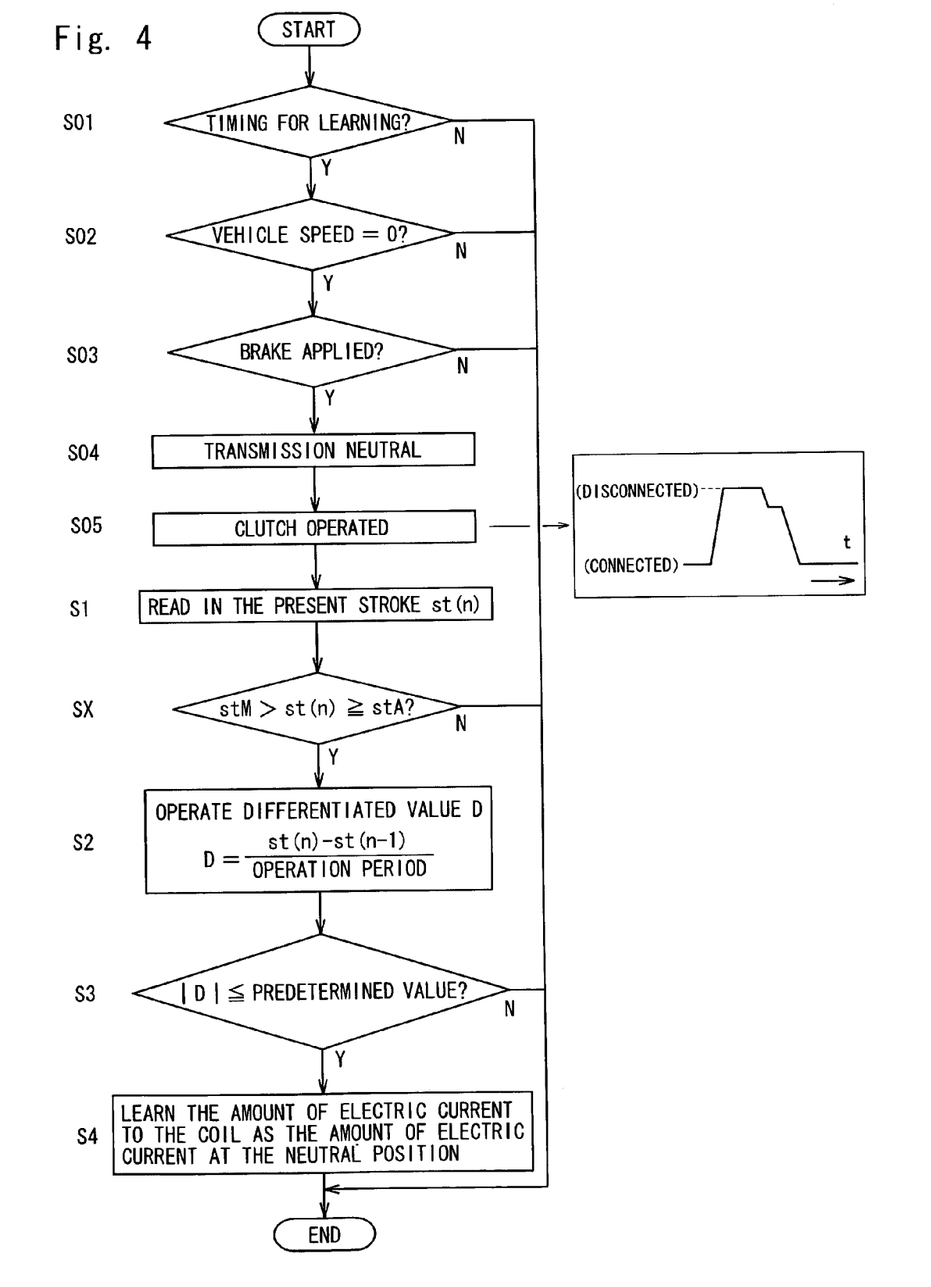
FIG. 4 is a flowchart of the neutral position learning device according to a modified embodiment of the invention.

Learning the neutral position of the flow rate control valve shown in FIG. 2 or FIG. 3 is executed when the clutch is operated at the time of gear shifting or at the start of the vehicle. Learning the neutral position of the present invention is not limited to, so to say, when the vehicle is normally traveling but may also be executed while the vehicle is at a halt by rendering the transmission to be neutral. FIG. 4 is a flowchart of that case.

In the flowchart of FIG. 4, if the timing for learning the neutral position is reached is decided at S01. If the timing for learning is reached, it is decided if the vehicle is at a halt (vehicle speed=0) at S02 and if the brake of the vehicle has been applied at S03. If these learning conditions are holding, the state of the transmission is detected. If the transmission is not neutral, an instruction is fed to the transmission control device to render it to be neutral (S04). Upon being rendered neutral, the transmission of power from the engine to the wheels is cut off. In this state, therefore, the clutch actuator 110 is driven by the flow rate control valve 1 to disconnect and connect the clutch (S05), whereby the neutral position is learned according to the same procedure as that of the flowchart of FIG. 3 (or FIG. 2).

According to this learning method, it is allowed to freely set a pattern for changing the stroke of the clutch and, therefore, to set a pattern that is suited for learning the neutral position of the flow rate control valve and to execute the correct learning. Further, since the neutral position of the valve body is learned while the brake of the vehicle is being applied, it does not happen that the vehicle starts moving unexpectedly, and the neutral position can be safely learned. Leaning in the neutral state is completed within a short period of time, thereby starting the vehicle is not almost affected.

The clutch control device is, usually, equipped with a half-engage clutch learning device so as to learn, at regular intervals, a change in the stroke at the half-engage clutch position caused by the wear of the clutch friction disk with the passage of time. Learning the half-engage clutch state is executed by disconnecting and connecting the clutch when there are held the same learning conditions as those of the flowchart of FIG. 4. Therefore, learning the neutral position by the flowchart of FIG. 4 can be executed simultaneously with learning the half-engage clutch state.

Figure 5:
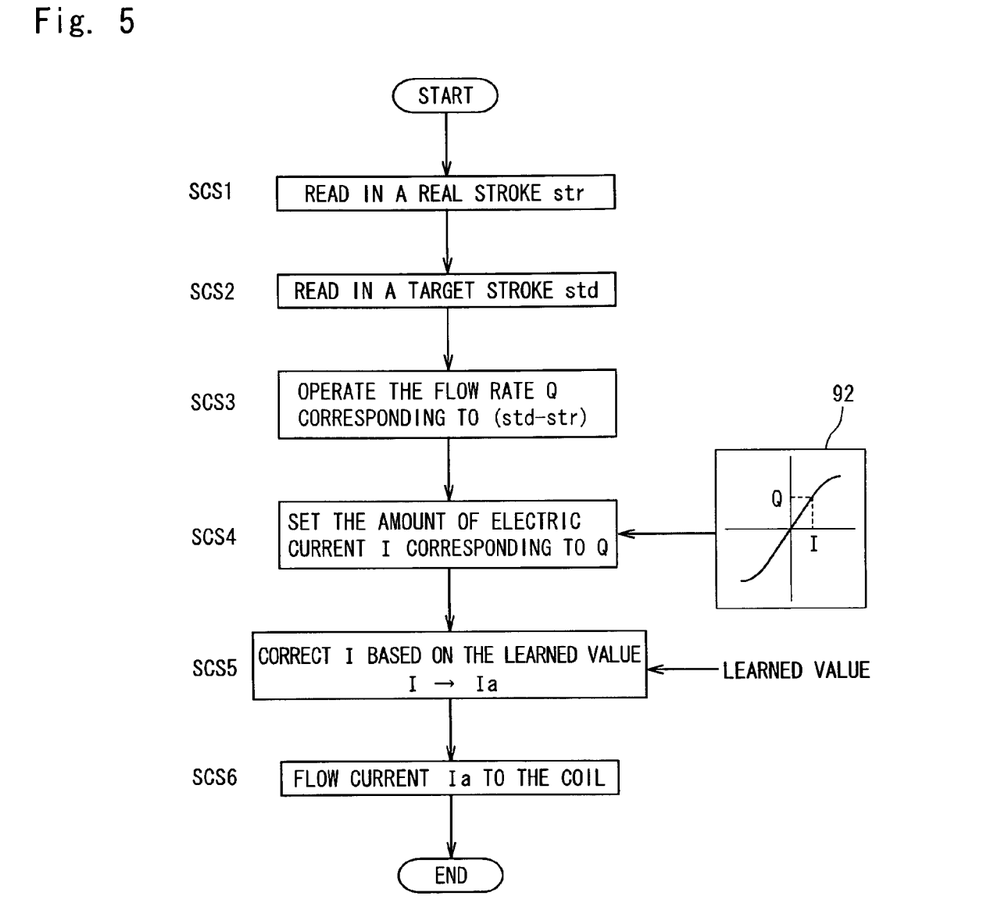
FIG. 5 is a flowchart of a stroke control in the clutch control device of the invention.

FIG. 5 shows a flowchart for executing the stroke control of the clutch actuator by using the flow rate control valve control device equipped with the neutral position learning device of the present invention.

In operating the clutch for gear shifting, the stroke (rate of connection of the clutch) is controlled so as to vary according to the pattern of FIG. 10 with the passage of time. The stroke control starts at a moment when a shift-change signal is generated from a shift lever or the like and at step SCS1, a real stroke str which is a detection signal of the stroke sensor 7 is read. At SCS2, the stroke after a predetermined period of time has passed is set as a target stroke std. At SCS3, the flow rate Q of the flow rate control valve 1 is operated depending upon a difference between the target stroke std and the real stroke str so as to attain the target stroke std after the passage of the predetermined period of time.

Figure 9:
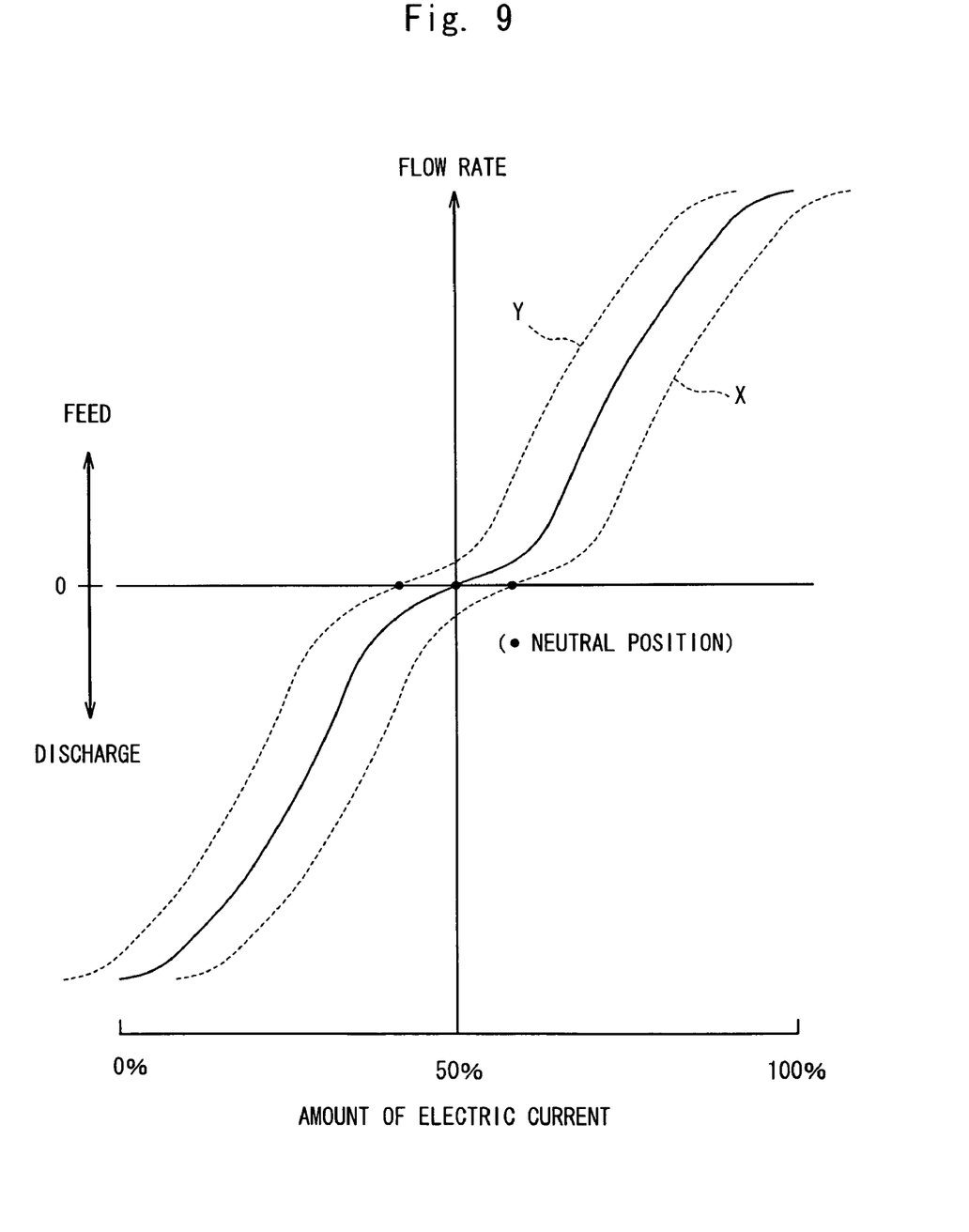
FIG. 9 is a diagram illustrating flow rate characteristics of a flow rate control valve.

The flow rate control valve control device 9 is storing a relationship between the flow rate and the amount of electric current to the coil 8, i.e., storing the flow rate characteristics represented by the solid line in FIG. 9 in the form of a map 92. At SCS4, the amount of the electric current I corresponding to the flow rate Q is determined by using the map 92. The flow rate control valve control device 9, on the other hand, is storing the amount of the electric current at the neutral position learned by the neutral position learning device 91. At SCS5, the amount of the electric current I is corrected based on a difference between the amount of the electric current at the neutral position in the map 92 and the learned value. At SC6, a corrected amount of electric current Ia is fed to the coil 8 of the electromagnetic solenoid. As a result, the valve body 6 in the flow rate control valve 1 assumes a position corrected by the learned value, and can be correctly corresponded to the required flow rate Q.

In this flowchart, the amount of electric current determined by the map 92 of flow rate characteristics is corrected by using the learned value. The amount of electric current, however, may be corrected by varying the flow rate characteristics of the map 92 based on the learned value as represented by broken lines in FIG. 9.

INDUSTRIAL APPLICABILITY

According to the present invention as described above in detail, the clutch control device that uses a single flow rate control valve is provided with a learning device for learning the neutral position of the flow rate control valve, and the learning device learns the neutral position when the rate of change in the stroke of the clutch actuator becomes smaller than a predetermined value. Therefore, the present invention can be applied to the clutch control device for vehicles irrespective of whether the fluid pressure for driving the clutch actuator is a pneumatic pressure or a hydraulic pressure. Further, though the above embodiment has described the case of using the electromagnetic solenoid and controlling the flow rate control valve by varying the amount of electric current to the coil, it will be obvious that the embodiment can be varied in a variety of ways, such as executing the control by using a hydraulic cylinder as disclosed in the patent document 1 that controls the flow rate control valve by using a pulse motor and varying the number of pulses (amount of operation).

The invention claimed is:

1. A clutch control device in a power transmission device for vehicle having a clutch installed between an engine and a transmission, wherein:
    said clutch control device includes a clutch actuator driven by a working fluid, a stroke sensor for detecting the movement of said clutch actuator, a flow rate control valve for controlling the amount of the working fluid in said clutch actuator, and a flow rate control valve control device for controlling the position of a valve body of said flow rate control valve responsive to a detection signal from said stroke sensor;
    said flow rate control valve is connected to a communication passage communicated with said clutch actuator, to a pressure source passage communicated with a working fluid pressure source, and to a discharge passage for discharging the working fluid from said clutch actuator, and, at the neutral position of said valve body, said communication flow passage is cut off from said pressure source passage and said discharge passage; and
    said flow rate control valve control device is provided with a neutral position learning device for learning the neutral position of said valve body, and said neutral position learning device decides that the neutral position is attained when a rate of change of the detection signal from said stroke sensor becomes smaller than a predetermined value.

2. The clutch control device according to claim 1, wherein said neutral position learning device decides that the neutral position is attained when the rate of change of the detection signal from said stroke sensor becomes smaller than the predetermined value continuously for a predetermined period of time.

3. The clutch control device according to claim 1, wherein the movement of said clutch actuator includes a maximum value that is mechanically limited, and said neutral position learning device executes the learning of the neutral position of said valve body when the movement of said clutch actuator is not smaller than a predetermined value but is smaller than said maximum value.

4. The clutch control device according to claim 1, wherein when said vehicle is at a halt, said neutral position learning device renders said transmission to be neutral and operates said clutch actuator so as to execute the learning of the neutral position of said valve body.

5. The clutch control device according to claim 3, wherein said neutral position learning device executes the learning of the neutral position of said valve body when the brake of said vehicle is being applied.

6. The clutch control device according to claim 1, wherein said flow rate control valve is provided with an electromagnetic solenoid for driving said valve body, and said flow rate control valve control device controls the electric current flowing into a coil of said electromagnetic solenoid to change the position of said valve body.

7. The clutch control device according to claim 2, wherein when said vehicle is at a halt, said neutral position learning device renders said transmission to be neutral and operates said clutch actuator so as to execute the learning of the neutral position of said valve body.

8. The clutch control device according to claim 2, wherein said flow rate control valve is provided with an electromagnetic solenoid for driving said valve body, and said flow rate control valve control device controls the electric current flowing into a coil of said electromagnetic solenoid to change the position of said valve body.

9. The clutch control device according to claim 3, wherein said flow rate control valve is provided with an electromagnetic solenoid for driving said valve body, and said flow rate control valve control device controls the electric current flowing into a coil of said electromagnetic solenoid to change the position of said valve body.

10. The clutch control device according to claim 4, wherein said flow rate control valve is provided with an electromagnetic solenoid for driving said valve body, and said flow rate control valve control device controls the electric current flowing into a coil of said electromagnetic solenoid to change the position of said valve body.

* * * * *